United States Patent [19]
Brooks

[11] Patent Number: 6,151,189
[45] Date of Patent: Nov. 21, 2000

[54] DISK DRIVE SPINDLE MOTOR WITH EMBEDDED IONIZING SOURCE FOR STATIC CHARGE DISSIPATION

[75] Inventor: Peter E. Brooks, Rochester, Minn.

[73] Assignee: Western Digital Corporation, Irvine, Calif.

[21] Appl. No.: 09/221,614

[22] Filed: Dec. 28, 1998

[51] Int. Cl.[7] .................................................. G11B 33/14
[52] U.S. Cl. ........................................................... 360/97.02
[58] Field of Search .............................. 360/97.01, 97.02

[56] References Cited

U.S. PATENT DOCUMENTS

| | | |
|---|---|---|
| 3,818,545 | 6/1974 | Olson .......................................... 317/4 |
| 4,194,191 | 3/1980 | Salem . | 
| 4,361,763 | 11/1982 | Bryant et al. . |
| 5,053,754 | 10/1991 | Wong . |
| 5,696,585 | 12/1997 | Wahl et al. . |
| 5,729,404 | 3/1998 | Dunfield et al. . |
| 5,760,509 | 6/1998 | Chung . |

*Primary Examiner*—A. J. Heinz
*Attorney, Agent, or Firm*—Milad Shara

[57] ABSTRACT

A spindle motor for a disk drive includes a shaft, a stator, a hub, an upper bearing, a lower bearing, means for defining a gap and an ionization source. The stator is concentrically positioned about the shaft. The upper and lower bearings rotatably maintain the hub relative to the shaft and each include a plurality of balls, each ball made from a high resistivity material. The ionization source ionizes air in the gap for allowing static electric charge to dissipate through a conductive path provided by the ionized air in the gap.

23 Claims, 3 Drawing Sheets

DISK DRIVE SPINDLE MOTOR WITH EMBEDDED IONIZING SOURCE FOR STATIC CHARGE DISSIPATION

BACKGROUND OF THE INVENTION

1. Field of the Invention

The present invention relates to hard disk drives. More particularly, it relates to a disk drive including an ionizing source for facilitating dissipation of a static electric charge.

2. Description of the Prior Art and Related Information

A huge market exists for mass-market host computer systems such as servers, desktop computers, and laptop computers. To be competitive in this market, a hard disk drive must be relatively inexpensive, and must accordingly embody a design that is adapted for low-cost mass production. Numerous manufacturers compete in this expansive market and collectively conduct substantial research and development, at great annual cost, to design and develop innovative hard disk drives to meet increasingly demanding customer requirements.

Each of the various contemporary mass-marketed hard disk drive models provides relatively large data storage capacity, often in excess of 1 gigabyte per drive. A related attribute is the time at which this data can be accessed ("access time"). To this end, there exists substantial competitive pressure to develop mass-market hard disk drives that have even higher capacities with consistent, if not improved, data access times. Another requirement to be competitive in this market is that the hard disk drive must conform to a selected standard exterior size and shape often referred to as a "form factor". Generally, capacity and access rate are desirably increased without increasing the form factor, or the form factor is reduced without decreasing capacity.

Satisfying these competing constraints of low-cost, small size, high capacity, and rapid access requires innovation in each of numerous components or subassemblies. Typically, the main subassemblies of a hard disk drive are a head disk assembly and a printed circuit board assembly.

The head disk assembly includes an enclosure including a base and a cover; at least one disk having at least one recording surface; a spindle motor causing each disk to rotate; and an actuator arrangement. The recording surface defines a number of circular "tracks" onto which data is recorded. The actuator arrangement includes a separate transducer for each recording surface, and is movable to position each transducer relative to the respective recording surface. The printed circuit board assembly includes circuitry for processing signals and controlling operation of the drive.

Improvements in disks have given rise to increased storage capacity of the disk drive. For example, improvements in recording surface media in conjunction with actuator and transducer enhancements have increased the amount of data that can be stored on a particular data storage "track". Further, the number of available "tracks" per unit length on a particular disk (or "track density") has also increased. Taken in combination, these factors, along with other improvements, have resulted in disk drives having dramatically larger data storage capacities.

While improvements in data storage capacity are highly beneficial, other issues may arise. Namely, the access time generally increases with increased data storage capacity and/or track density. In general terms, the access time includes the time required to seek to a given track ("seek time") and the time required to detect a target sector once the given track is reached. A related concern is rotational latency, or the measure of the average time the transducer must wait for a target sector on the recording surface to pass under the transducer once the transducer is moved to the desired target track. Rotational latency is dependent upon the rotational speed of the disk.

To overcome the potential access time issues raised by larger data storage capacity, efforts have been made to increase the rotational speed of the disk. Hard drives normally spin at one constant speed. Typical speeds range from 5400 to 7200 revolutions per minute (rpm). Notably, the slower the rpm, the higher the rotational latency. Thus, regardless of data storage capacity, an increase in a disk drive rpm enhances overall performance.

The rpm capability of a particular disk drive is determined by the spindle motor. A disk drive spindle motor typically includes a central shaft, an upper bearing, a lower bearing, a stator and a rotor (or "hub"). The hub normally forms a flange to which the disk(s) is attached. The hub itself is concentrically positioned about the shaft. To this end, the upper and lower bearings maintain the hub in this concentric position such that the hub is rotatable about the shaft. The stator includes a series of coils and is concentrically positioned about the shaft, adjacent the hub. With this general configuration, the various coils of the stator are selectively energized to form an electromagnet that pulls/pushes on a magnet otherwise associated with the hub, thereby imparting a rotational motion onto the hub. With this arrangement, rotation of the hub results in rotation of the attached disk(s).

With improvements in the materials and circuitry associated with the above-described spindle motor design, it is now possible to provide a spindle motor having a rotational speed in excess of 7200 rpm, such as 10,000 rpm. While designs of this type address the access time and rotational latency issues described above, certain other concerns may arise. More particularly, in order to achieve rotational speeds in excess of 7200 rpm such as 10,000 rpm, alternative bearing designs must be used. Typically, prior art spindle motor bearings include an inner race, an outer race and a plurality of balls. These components are normally made of metal, such as steel. Often times, to alleviate vibration caused by the steel bearings, grease or other lubrication must be used. This grease may, in fact, limit the rpm capabilities by creating a small amount of friction. Additionally, steel bearings may deteriorate at a rotational speed of 10,000 rpm. To overcome these potential limitations, spindle motors incorporating bearings made of ceramic or related materials have been envisioned.

Unfortunately, use of ceramic or similar materials for the bearings may give rise to certain other problems. For example, during rotation, static electric charge is built up on the recording surface of the disk(s). Over time, this static electric charge, unless removed, creates a high voltage potential between the transducer and the rotating disk which may cause the static electric charge to discharge to the transducer, leading to potentially catastrophic results. Normally, the steel material used for the upper and lower bearings, in conjunction with a shaft made of aluminum or steel, provides a grounding source or conductive path for dissipating the potentially damaging static charge from the recording surface. In contrast, ceramic or similar materials have a high resistivity and will not provide a grounding or conductive path. In other words, a disk drive incorporating ceramic bearings cannot dissipate static electric charge generated during disk rotation, leading to errors and/or failure.

Accordingly, substantial research and development efforts have been expended to provide an improved spindle motor design that operates at speeds in excess of 7200 rpm, yet satisfactorily dissipates built up static electric charge.

SUMMARY OF THE INVENTION

The present invention can be regarded as a disk drive comprising a base, a spindle motor, a magnetic head coupled to the base, and a disk. The spindle motor is coupled to the base. The disk is positioned on the spindle motor and includes a recording surface that is subject to a buildup of static electric charge. The spindle motor includes a shaft, a stator, a hub, an upper bearing, a lower bearing, means for defining a gap, and an ionization source. The shaft defines a longitudinal axis about which the hub is concentrically positioned. The upper and lower bearings are positioned between the shaft and the hub, and each includes a plurality of balls, each ball made from a high resistivity material. The stator is concentrically positioned about the shaft. Finally, the ionization source is provided for ionizing air in the gap for allowing the static electric charge to dissipate from the recording surface through a conductive path provided by the ionized air in the gap. To this end, the means for defining a gap can be formed at a variety of locations. In one preferred embodiment, the ionization source is positioned proximal to the gap.

The present invention can also be regarded as a spindle motor for a disk drive including a disk. The disk includes a recording surface that is subject to a buildup of static electric charge. The spindle motor includes a shaft, a stator, a hub, an upper bearing, a lower bearing, means for defining a gap and an ionization source. The shaft defines a longitudinal axis about which the stator is concentrically positioned. The upper bearing and the lower bearing each include a plurality of balls, each ball made from a high resistivity material. The lower bearing is spaced apart from the upper bearing along the longitudinal axis. Further, each of the upper and lower bearings are positioned between the shaft and the hub such that the hub surrounds the shaft. Finally, the ionization source is provided for ionizing air in the gap for allowing the static electric charge to dissipate from the recording surface through a conductive path provided by the ionized air in the gap.

The present invention can also be regarded as a spindle motor for a disk drive including a disk, the disk having a recording surface that is subject to a buildup of static electric charge, the spindle motor including a shaft defining a longitudinal axis, a stator concentrically positioned about the shaft, a hub surrounding the shaft, and bearing means for rotating the hub, the bearing means positioned between the shaft and the hub. The spindle motor further includes means for defining a gap and an ionization source for ionizing air in the gap for allowing the static electric charge to dissipate from the recording surface through a conductive path provided by the ionized air in the gap.

DETAILED DESCRIPTION OF A PREFERRED EMBODIMENT

Figure 1:
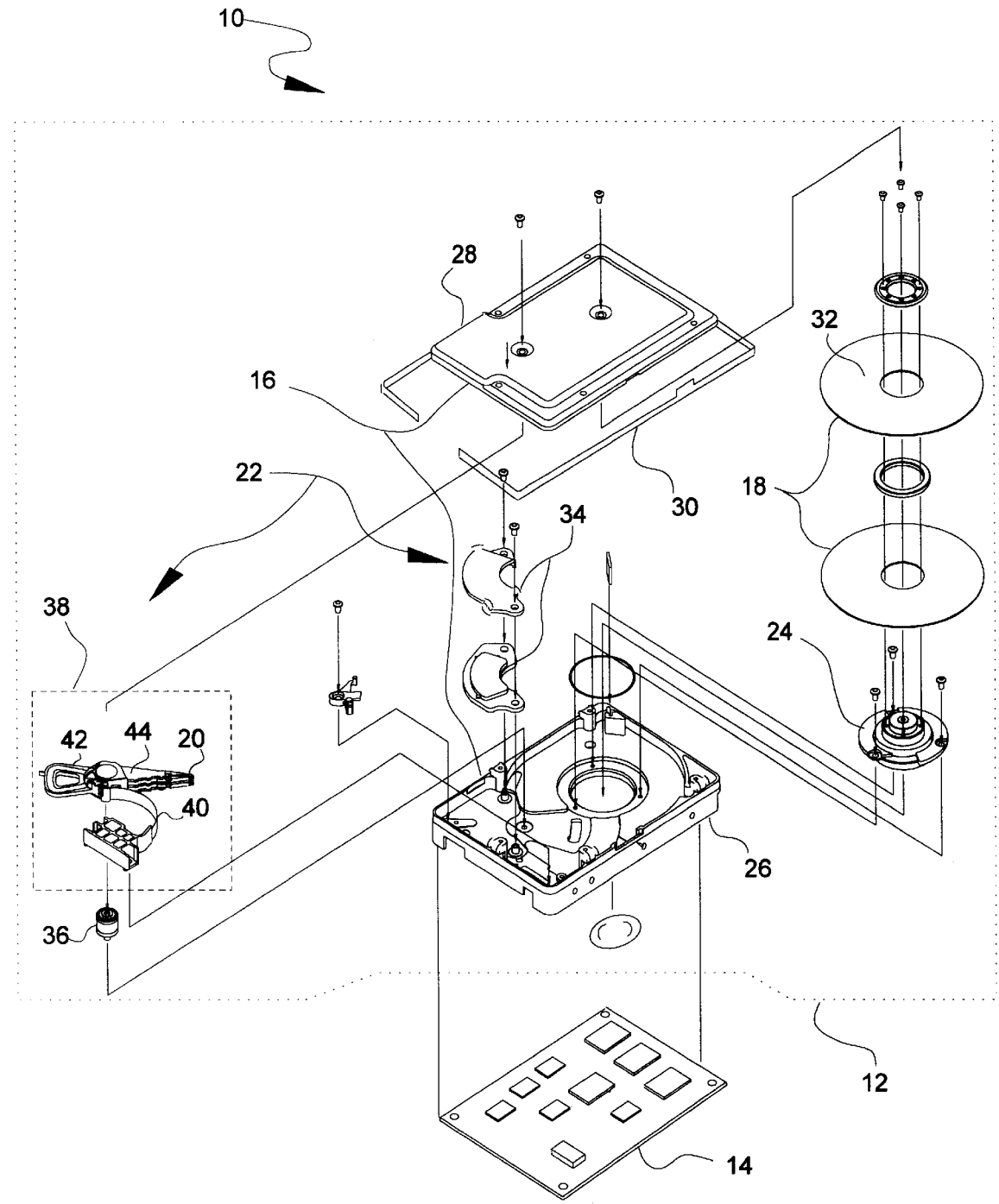
FIG. 1 is an exploded view of a hard disk drive in accordance with the present invention.

As shown in FIG. 1, a disk drive 10 embodying one preferred embodiment of the present invention includes a head disk assembly 12 and a printed circuit board assembly 14. The printed circuit board assembly 14 is suitably secured to an exterior of the head disk assembly 12 and controls operation of various components thereof.

The head disk assembly 12 includes an enclosure 16, a magnetic disk 18, a magnetic transducer ("magnetic head") 20, a rotary actuator arrangement 22 and a spindle motor generally indicated at 24. As described in greater detail below, the magnetic disk 18, the magnetic transducer 20, the rotary actuator arrangement 22 and the spindle motor 24 are maintained within the enclosure 16.

The enclosure 16 comprises a base 26 and a cover 28. The enclosure 16 is sealed to provide a relatively contaminate-free interior for remaining components of the head disk assembly 12. Suitably, a tape seal 30 is used to seal the enclosure 16.

The magnetic disk 18 and the magnetic transducer 20 are positioned within an interior of the enclosure 16. The magnetic disk 18 includes a recording surface 32. Suitably, the magnetic disk 18 has a substrate formed from aluminum or aluminum alloy, with the recording surface 32 including magnetic material deposited on the aluminum substrate. The particular embodiment shown in FIG. 1 includes a stack of two disks 18 providing four recording surfaces 32, and includes four magnetic transducers 20. Of course, the number of disks 18 may be less than or greater than two. The number of transducers 20 corresponds with the number of disks 18.

The rotary actuator arrangement 22 provides for positioning of the magnetic transducers 20 over a selected area of the recording surfaces 32 of the magnetic disk 18. The rotary actuator arrangement 22 includes a permanent-magnet arrangement generally indicated at 34, a pivot bearing cartridge 36 and a head stack assembly 38. The pivot bearing cartridge 36 includes a stationary shaft secured to the enclosure 16 to define an access of rotation for the head stack assembly 38. The head stack assembly 38 includes a flex circuit assembly 40, a coil 42 and actuator arms 44. Each one of the magnetic transducers 20 is secured to a respective one of the arms 44. During use, circuitry (not shown) causes current to conduct through the coil 42, and because the coil 42 lies in the magnetic field provided by the permanent magnet arrangement 34, a torque is applied to the head stack assembly 38. The amount and direction of that torque is subject to control by a servo system that controls the rotary position of the magnetic transducer 20 relative to the respective recording surface 32 of the magnetic disk 18. The disk 18 is mounted to the spindle motor 24 that causes each disk 18 to spin, preferably at a constant angular velocity. In this regard, as described in greater detail below, rotation of the magnetic disk 18 generates a static electric charge at the recording surface 32.

Figure 2:
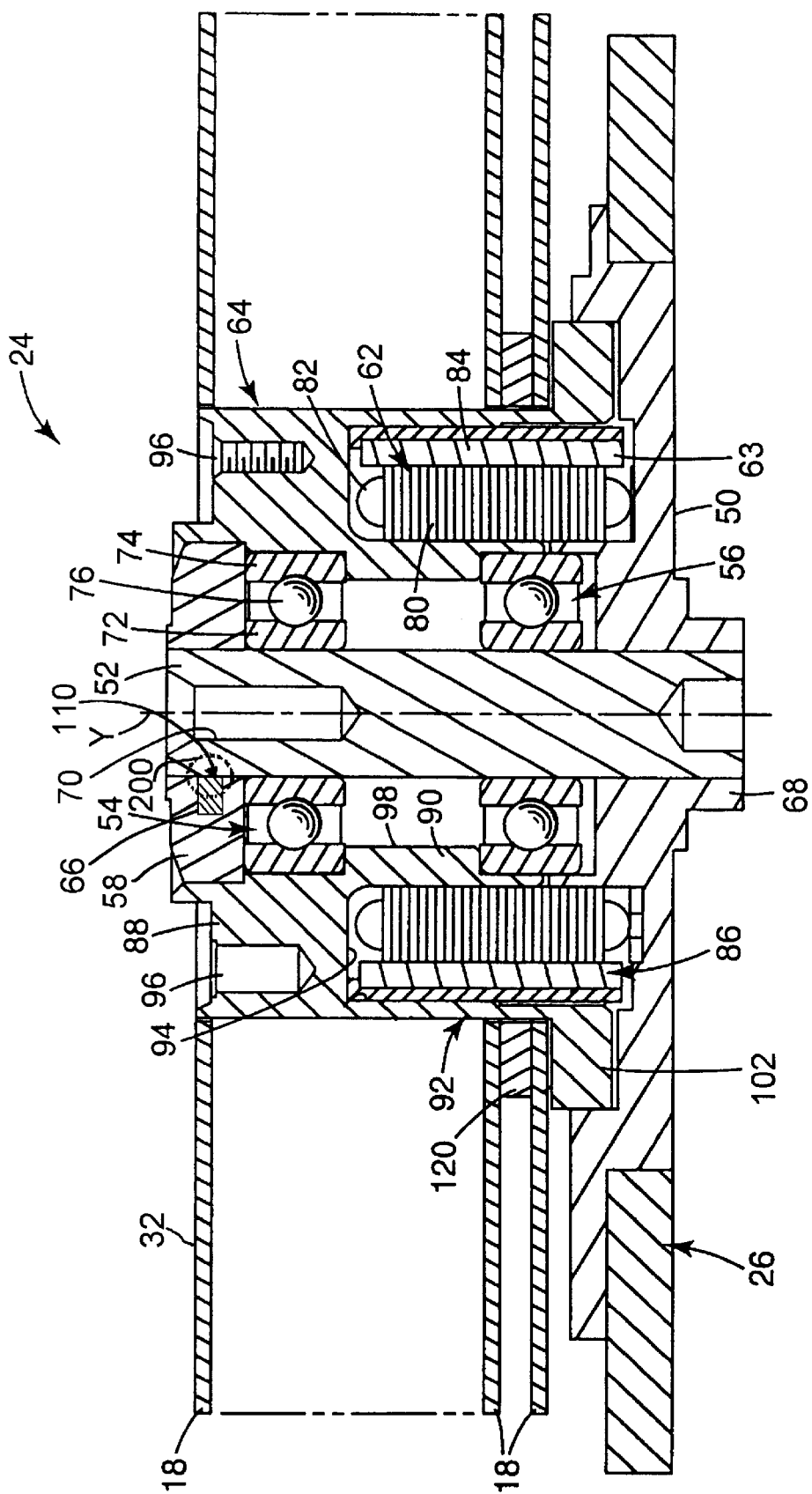
FIG. 2 is an enlarged, cross-sectional view of a portion of FIG. 1 which includes the spindle motor and a plurality of disks.

The spindle motor 24 is shown in more detail in FIG. 2. The spindle motor 24 includes a spindle motor base 50, a shaft 52, bearing means for rotating a hub such as an upper bearing 54 and a lower bearing 56, an upper seal 58, a stator 62, a magnet 63, a hub 64 and an ionization source 66. In an alternative embodiment, bearing means is formed by an air bearing such as an air bearing disclosed in U.S. Pat. No. 5,760,509 which is incorporated by reference herein. Details of the various components are provided below. In general terms, however, the shaft 52 is secured to the spindle motor base 50. The upper bearing 54 and the lower bearing 56 are spaced-apart along the shaft 52 and rotatably secure the hub 64 about the shaft 52. In this regard, the upper seal 58 seals the upper bearing 54 relative to the shaft 52. The stator 62 is concentrically positioned about the shaft 52, adjacent the hub 64. Finally, the ionization source 66 is positioned to facilitate dissipation of static electric charge otherwise generated by rotation of the disk(s) 18.

The spindle motor base 50 is made of a rigid material, such as aluminum, and is suitably sized to be received by the base 26 of the enclosure 16 (FIG. 1). Similarly, the shaft 52 is made of a rigid material, such as aluminum or steel, and is suitably sized to be received by the spindle motor base 50. As shown in FIG. 2, the shaft 52 is configured to extend in a perpendicular fashion from a central portion 68 of the spindle motor base 50 so as to define a longitudinal axis Y. In one preferred embodiment, the shaft 52 includes a bore 70 suitably sized to receive a screw for securing the shaft 52 to the enclosure 16 (FIG. 1).

The upper bearing 54 and the lower bearing 56 each include an inner race 72, an outer race 74 and a plurality of balls 76. The inner race 72 is associated with the outer race 74 so as to contain the balls 76. The inner race 72, the outer race 74 and the balls 76 are suitably formed to facilitate high speed rotation of the hub 64 at rates in excess of 7200 rpm, such as 10,000 rpm. To this end, a hardened, low friction material or composite is employed, for example a ceramic or ruby material. Thus, for example, the balls 76 are made from the ceramic or ruby material, whereas the inner race 72 and the outer race 74 are formed from other hardened, less expensive materials such as steel. Alternatively, each of the inner race 72, the outer race 74 and the balls 76 are formed from ceramic or ruby material. Regardless of exact composition, the hardened, low friction material has a high resistivity. For example, the high resistivity material suitably has a resistance greater than about 10 megaohms. Thus, unlike typically employed bearings, the upper bearing 54 and the lower bearing 56 do not readily provide a conductive path for dissipating static electric charge.

The stator 62 preferably has a ring configuration, and includes a stator core 80 and wires generally shown at 82. The wires 82 are wound about the stator core 80, and are electrically connected to a current supply (not shown). In a preferred embodiment, the wires 82 include at least three wires wound about the stator core 80, each of the three wires defining a separate coil able to selectively receive an independent current supply. With this configuration, energizing one set of coils forms an electromagnet at that particular coil.

The magnet 63 is suitably in the shape of a ring, and is defined by a first half 84 and a second half 86. With this configuration, the first half 84 and the second half 86 define separate magnetic poles.

The hub 64 is generally cylindrical in shape, having a central portion 88, a thrust surface 90 and an axial wall 92. The thrust surface 90 and the axial wall 92 extend axially from the central portion 88 as shown in FIG. 2. In this regard, extension of the thrust surface 90 and the axial wall 92 defines a slot 94 sized to provide clearance about the stator 62. In a preferred embodiment, the hub 64 is integrally formed from a hardened material such as aluminum or steel.

Suitably, the central portion 88 of the hub 64 is sized to receive a clamping device (not shown) via bores 96. More particularly, the clamping device is mounted to the hub 64 via screws extending into the bores 96 to mount the stack of disks 18 to the hub 64.

The thrust surface 90 is suitably sized for attachment to the upper bearing 54 and the lower bearing 56. Thus, the thrust surface 90 includes a radial extension 98 having an inner diameter less than an outer diameter of the outer race 74 of each of the upper and lower bearings 54, 56.

The axial wall 92 extends from the central portion 88 and terminates in a flange 102. The flange 102 extends in a radial fashion and is suitably sized to support the disk 18.

The upper seal 58 is suitably ring-shaped, having an inner diameter approximating a diameter of the shaft 52. In one preferred embodiment, the upper seal 58 is a labyrinth seal which in conjunction with a portion of shaft 52 form a means for defining a gap 110. In general terms, a labyrinth seal is a two piece non-contacting seal that isolates various contaminates generated by the spindle motor 24. In this regard, the gap 110 provides a restricted flow path. When rotated, the upper, labyrinth seal 58 utilizes flow direction and van der waals forces to prevent intrusion of contaminants through the path presented by the gap 110. The upper, labyrinth seal 58 is therefore designed to prevent contaminates from contacting the disk(s) 18 or otherwise entering the sealed disk environment. It should be understood, however, that the upper seal 58 need not necessarily be a labyrinth seal. Instead, other sealing techniques may be employed, including a lip seal, a ferro-fluid, etc.

The ionization source 66 is a device or material suitably formed to ionize air in a gap, such as the gap 110. In one preferred embodiment, the ionization source 66 is a radiation source similar to that associated with an ionization-type smoke detector. Thus, the ionization source 66 suitably includes a low-level radioactive source material that emits alpha particles as the material decays. The alpha particles emitted by ionization source 66 collide with the oxygen and nitrogen in the air in the gap to produce charged particles ("ions"). These positively and negatively charged ions result in a weak electric current. The alpha particles produced by the ionization source 66 suitably travel only a few centimeters in air before they are absorbed. For example, the ionization source 66 may include a small amount of americium-241 isotope as a radioactive material. More particularly, the ionization source 66 suitably includes americium-241 dioxide in a gold matrix covered by a silver foil. The americium-241 emits alpha particles (nucleus of a helium atom) and low energy gamma rays. The silver foil is thin enough to allow the alpha particles to escape into an adjacent gap (such as the labyrinth gap 110). Americium-241 has a half-life of 432 years. The "strength" of the source of americium-241 or other material is suitably in the range of approximately 0.1–10 microcurie. One suitable ionization source 66 is available from NRD, Inc. of Grand Island, N.Y. in the form of a spot ionization body having a diameter of approximately 1 inch and a thickness of approximately ⅜ inch.

While the ionization source 66 has been preferably described as employing americium-241, other ionization source materials and/or devices are also acceptable. To this end, a wide variety of other isotopes, including those formed by cobalt, radium, etc. may also be employed. Even further, a device other than a radioactive material may be employed, so long as the device is properly sized to be maintained within the spindle motor 24.

The spindle motor 24 is assembled substantially as follows. The shaft 52 is secured to the spindle motor base 50, such as by a press fitting operation. As shown in FIG. 2, the shaft 52 extends from the spindle motor base 50 in a generally perpendicular fashion to define the longitudinal axis Y. The upper bearing 54 and the lower bearing 56 are then secured to the shaft 52. For example, the inner race 72 of the upper bearing 54 is secured to the shaft 52 axially spaced from the lower bearing 56. The stator 62 is concentrically positioned about the shaft 52 adjacent the spindle motor base 50. The hub 64 and the magnet 63 are assembled and then positioned about the shaft 52. The hub 64 is then concentrically positioned about the shaft 52 along a direction of the longitudinal axis Y. In this regard, the thrust surface 90 is secured to the upper bearing 54 and the lower bearing 56. For example, the radial extension 98 is suitably press fitted between the upper bearing 54 and the lower bearing 56. Regardless of the exact form of attachment, the thrust surface 90 is mounted to the outer race 74 of the upper and lower bearings 54, 56 so that the hub 64 can rotate about the shaft 52 via the upper and lower bearings 54, 56.

The position of the hub 64 about the shaft 52 positions the stator 62 within the slot 94 of the hub 64. As shown in FIG. 2, the stator 62 is substantially coextensive with the magnet 63.

The upper seal 58 and the ionization source 66 are then provided. In one preferred embodiment, the ionization source 66 is embedded within the upper seal 58. Where the upper seal 58 is preferably a labyrinth seal, the ionization source 66 is positioned proximal to the gap 110 so as to ionize air within the gap 110 as best shown in FIG. 3.

Figure 3:
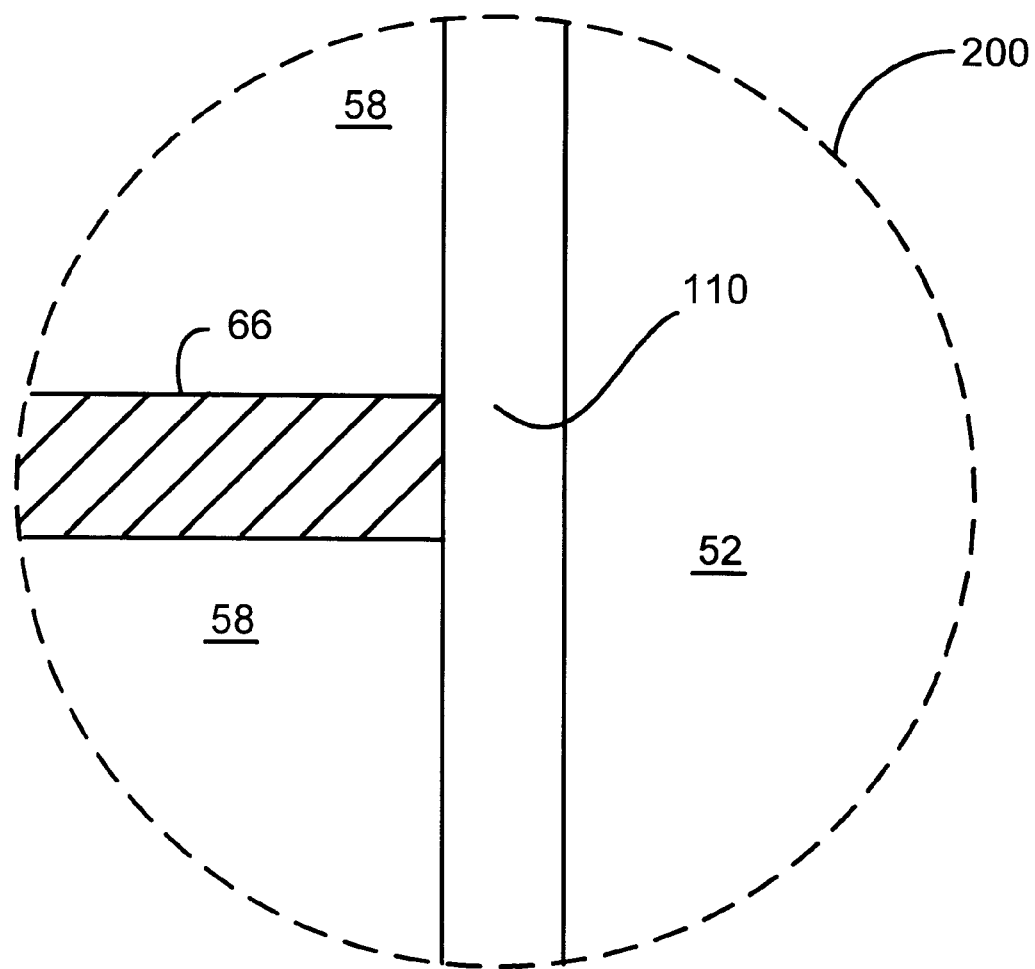
FIG. 3 is an enlarged, cross sectional view of a portion of FIG. 2.

With reference to FIG. 3, a dashed line portion 200 includes ionization source 66 embedded in upper seal 58. As shown, gap 110 is defined by a portion of shaft 52, upper seal 58, and ionization source 66. Preferably, gap 110 has a sufficiently small width to limit the size of ionization source 66. The width of gap 110 is preferably from 0.0005–0.003 inches.

Continuing with FIG. 2, the upper seal 58 is then secured to the hub 64. With this location, the upper seal 58 is sealed to the upper bearing 54 and the shaft 52, but will rotate with rotation of the hub 64.

Embedding the ionization source 66 within the upper seal 58 is but one possible manufacturing technique. In an alternative embodiment, ionization source 66 may be embedded in shaft 52. By locating the ionization source 66 in close proximity to the gap 110 provided by the upper seal 58, air within the gap 110 can be ionized with a relatively low-grade alpha particle emitting source. Further, because a size of the upper seal 58 has previously been accounted for in the design of the spindle motor 24, inclusion of the ionization source 66 in the upper seal 58 will not affect the overall size of the spindle motor 24. Thus, the ionization source 66 will not change the form factor size requirements associated with the spindle motor 24.

The gap 110 is but one possible static electric charge conductive path. Instead, means for defining a gap can be formed at other locations within the interior of spindle motor 24. With this in mind, the upper seal 58 need not necessarily be a labyrinth type seal. Even further, the upper seal 58 may be eliminated entirely. Regardless of the exact construction, the means for defining a gap is suitably positioned such that a gap is provided through which static electric charge built up on a disk recording surface can be dissipated. In an alternative embodiment, means for defining a gap may include radial extension 98 and the portion ("middle portion") of shaft 52 between the bearings; in this embodiment, ionization source would suitably be embedded in either radial extension 98 or the middle portion the shaft. In yet another alternative embodiment, means for defining a gap may include a lower seal (not shown) positioned below lower bearing 56, and a portion ("bottom portion") of shaft 52 below lower bearing 56; in this embodiment, ionization source 66 would suitably be embedded in the lower seal or in the bottom portion of the shaft.

Following assembly of the upper seal 58, the spindle motor 24 is mounted to the base 26. Finally, the disk(s) 18 is mounted to the hub 64, with a bottom disk abutting the flange 102. While the bottom disk is in direct contact with the flange 102, each disk 18 is centrally spaced apart radially from the axial wall 92. FIG. 2 depicts a stack of disks 18, with a spacer 120 between any two given disks 18. The disks 18, along with a respective spacer 120, are secured to the flange 102 by a clamping device (not shown) attached to the central portion 88 of the hub 64.

During use, the spindle motor 24 operates as follows. Cyclical energization of the wires 82 of the stator 62 imparts a rotational torque onto the magnet 63 and thus the hub 64. The disks 18, otherwise attached to the hub 64, likewise rotate. By employing a low friction material for the upper bearing 54 and the lower bearing 56, the hub 64 can rotate at speeds in excess of 7200 rpm. During rotation, static electric charge is generated by the disks 18, in particular at the recording surfaces 32. Because the upper bearing 54 and the lower bearing 56 are comprised of a high resistivity material, the upper and lower bearings 54, 56 do not provide a conductive or grounding connection to the shaft 52. Instead, the ionization source 66 in combination with the gap 110 serves to dissipate the static electric charge. More particularly, the ionization source 66 emits alpha particles that ionize air within the gap 110. The ionized air within the gap 110 provides a conductive path that dissipates or discharges the static electric charge from the disks 18. To this end, the positive and negative charged ions in the gap 110 (resulting from alpha particles emitted by the ionization source 66) provide an electrical path to the shaft 52, which in turn acts as a ground. With this configuration, static electric charge generated by rotation of the disks 18 is dissipated through the conductive path provided by the ionized air in the gap 110. As previously described, the labyrinth-type upper seal 58 is but one means for defining a gap through which the conductive path may be established. Similarly, the ionization source 66 can be located at a different location within the spindle motor 24 and yet still accomplish the desired air ionization effect.

The disk drive 10 (FIG. 1) having the spindle motor 24 in accordance with the present invention facilitates high rotational speeds while eliminating the undesirable buildup of static electric charge. The normally steel-based bearings are replaced with low friction, high resistivity material. Implementation of an ionization source in combination with a means for defining a gap addresses the static electric charge issue otherwise presented by the use of high resistivity material for the bearings. In particular, the ionization source ionizes air in the gap for allowing the static electric charge to dissipate from the disks through a conductive path provided by the ionized air in the gap.

I claim:

1. A disk drive comprising:
   a base;
   a spindle motor coupled to the base;
   a magnetic head coupled to the base;
   a disk positioned on the spindle motor, the disk having a recording surface that is subject to a buildup of static electric charge; and
   the spindle motor including:
     a shaft defining a longitudinal axis,
     a stator concentrically positioned about the shaft,
     a hub surrounding the shaft,
     an upper bearing,
     a lower bearing spaced-apart from the upper bearing along the longitudinal axis,
     the upper and lower bearings positioned between the shaft and the hub, each bearing having a plurality of balls, each ball made from a high resistivity material, means for defining a gap, an ionization source for ionizing air in the gap for allowing the static electric charge to dissipate from the recording surface through a conductive path provided by the ionized air in the gap.

2. The disk drive of claim 1, wherein the ionization source is a radiation source.

3. The disk drive of claim 2, wherein the radiation source is configured to emit alpha particles.

4. The disk drive of claim 1, wherein the ionization source is positioned proximal to the gap.

5. The disk drive of claim 1, wherein the means for defining a gap includes a labyrinth seal and a portion of the shaft.

6. The disk drive of claim 5, wherein the labyrinth seal is positioned above the upper bearing.

7. The disk drive of claim 5, wherein the ionization source is embedded within the seal.

8. The disk drive of claim 1, wherein the high resistivity material is a ceramic material.

9. The disk drive of claim 1, wherein the upper and lower bearings each further include an inner race and an outer race, the inner race and the outer race being made from a high resistivity material.

10. A spindle motor for a disk drive including a disk, the disk having a recording surface that is subject to a buildup of static electric charge, the spindle motor comprising:

a shaft defining a longitudinal axis;

a stator concentrically positioned about the shaft;

a hub surrounding the shaft;

an upper bearing;

a lower bearing spaced-apart from the upper bearing along the longitudinal axis;

the upper and lower bearings positioned between the shaft and the hub, each bearing having a plurality of balls, each ball made from a high resistivity material;

means for defining a gap; and an ionization source for ionizing air in the gap for allowing the static electric charge to dissipate from the recording surface through a conductive path provided by the ionized air in the gap.

11. The spindle motor of claim 10, wherein the ionization source is a radiation source.

12. The spindle motor of claim 11, wherein the radiation source is configured to emit alpha particles.

13. The spindle motor of claim 10, wherein the ionization source is positioned between the hub and the shaft.

14. The spindle motor of claim 10, wherein the ionization source is positioned proximal to the gap.

15. The spindle motor of claim 10, wherein the means for defining a gap includes a labyrinth seal and a portion of the shaft.

16. The spindle motor of claim 15, wherein the labyrinth seal is positioned above the upper bearing.

17. The spindle motor of claim 15, wherein the ionization source is embedded within the seal.

18. The spindle motor of claim 10, wherein the high resistivity material is a ceramic material.

19. The spindle motor of claim 10, wherein the upper and lower bearings each include an inner race and an outer race, the inner race and the outer race being made from a high resistivity material.

20. A spindle motor for a disk drive including a disk, the disk having a recording surface that is subject to a buildup of static electric charge, the spindle motor comprising:

a shaft defining a longitudinal axis;

a stator concentrically positioned about the shaft;

a hub surrounding the shaft;

bearing means for rotating the hub, the bearing means positioned between the shaft and the hub;

means for defining a gap; and an ionization source for ionizing air in the gap for allowing the static electric charge to dissipate from the recording surface through a conductive path provided by the ionized air in the gap.

21. The spindle motor of claim 20 wherein the bearing means is an air bearing.

22. The spindle motor of claim 20 wherein the bearing means includes an upper bearing and a lower bearing spaced-apart from the upper bearing along the longitudinal axis, each bearing including a plurality of balls, each ball made from a high resistivity material.

23. The spindle motor of claim 22 wherein the high resistivity material is a ceramic material.

* * * * *